United States Patent
Pennella et al.

(10) Patent No.: US 8,205,790 B2
(45) Date of Patent: Jun. 26, 2012

(54) SYSTEM AND METHODS FOR CUSTOMER-MANAGED DEVICE-BASED AUTHENTICATION

(75) Inventors: Michael M. Pennella, Cornelius, NC (US); David C. Shroyer, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 752 days.

(21) Appl. No.: 11/687,310

(22) Filed: Mar. 16, 2007

(65) Prior Publication Data

US 2008/0226142 A1    Sep. 18, 2008

(51) Int. Cl.
*G06K 40/00* (2006.01)
(52) U.S. Cl. ............ 235/379; 235/375; 235/380
(58) Field of Classification Search ............ 235/375, 235/379, 380
See application file for complete search history.

(56) References Cited

U.S. PATENT DOCUMENTS

| | | | |
|---|---|---|---|
| 6,732,105 | B1 | 5/2004 | Watson, Jr. et al. |
| 7,272,728 | B2* | 9/2007 | Pierson et al. ............ 713/194 |
| 7,359,885 | B2* | 4/2008 | Yan ............ 705/64 |
| 2005/0044410 | A1* | 2/2005 | Yan ............ 713/201 |
| 2005/0091338 | A1 | 4/2005 | de la Huerga |
| 2005/0097320 | A1* | 5/2005 | Golan et al. ............ 713/166 |
| 2005/0165684 | A1* | 7/2005 | Jensen et al. ............ 705/44 |
| 2005/0193211 | A1* | 9/2005 | Kurose ............ 713/185 |
| 2005/0278542 | A1* | 12/2005 | Pierson et al. ............ 713/182 |
| 2006/0048211 | A1* | 3/2006 | Pierson et al. ............ 726/3 |
| 2006/0282660 | A1* | 12/2006 | Varghese et al. ............ 713/155 |
| 2007/0011463 | A1* | 1/2007 | Garfinkle ............ 713/186 |
| 2007/0100773 | A1* | 5/2007 | Wallach ............ 705/75 |

FOREIGN PATENT DOCUMENTS

| | | |
|---|---|---|
| EP | 1 443 414 A1 | 8/2004 |
| EP | 1443414 A | 8/2004 |
| WO | 2006/118968 A2 | 11/2006 |
| WO | WO 2006/118968 A2 | 11/2006 |

OTHER PUBLICATIONS

Bank of America Corporation, PCT International Search Report issued in corresponding International Patent Application No. PCT/US2008/056849.
Bank of America Corporation, PCT Written Opinion issued in corresponding International Patent Application No. PCT/US2008/056849.
PCT International Preliminary Report on Patentability mailed Oct. 1, 2009 for International Application No. PCT/US2008/056849.

* cited by examiner

*Primary Examiner* — Daniel Hess
*Assistant Examiner* — Paultep Savusdiphol
(74) *Attorney, Agent, or Firm* — Michael A. Springs; Moore & Van Allen PLLC; W. Kevin Ransom (57) ABSTRACT

A system and methods for customer-managed device-based authentication are disclosed. Embodiments of the invention provide a user interface that allows a customer with an on-line account to access and manage device fingerprint information that can be used to control or regulate the customer's access. Such a system can collect user input regarding device preferences related to specified devices to be used to access or to be prohibited or restricted from accessing an account. Information regarding these devices is stored in a database. The system can then assay a device fingerprint for a device to authenticate access by the device to the account based on the device preferences. In some embodiments, input can also be collected regarding alert preferences related to alerts connected with accessing the account from specified devices.

49 Claims, 4 Drawing Sheets

SYSTEM AND METHODS FOR CUSTOMER-MANAGED DEVICE-BASED AUTHENTICATION

BACKGROUND

Remote device identification is beginning to emerge as a standard tool to be used in managing computer resources. Remote device identification uses a capability sometimes referred to as "device fingerprinting" because a so-called "device fingerprint" can uniquely identify a computing device. Each computing device that connects to a network has a variety of parameters that can be captured and analyzed. The large number of different possible parameter combinations lead to the uniqueness of individual device fingerprints.

Some of the parameters that can make up a device fingerprint include the network address, operating system, and application being used to access the network. Installed hardware and central processing unit (CPU) attributes can also serve as device parameters. Almost limitless combinations of these parameters are possible such that each device connecting to a network will have a unique mix of parameters. Thus, a device can be identified by its device fingerprint with a relatively high degree of reliability. Multiple vendors provide commercial products to gather and maintain device fingerprint information, for example, the RSA division of EMC Corporation, and The 41$^{st}$ Parameter, Inc., both in the United States.

SUMMARY

Embodiments of the present invention provide a user interface that allows a customer with an on-line account, for example, an account that allows on-line financial transactions, to manage the devices that can be used to control or regulate access to that account. Thus, an end-user customer with relatively little computer science knowledge can provide for his or her own enhanced security, at any level desired.

In at least some embodiments, a system implementing the invention can provide for the customer-managed, device-based authentication of access to an account by collecting user input regarding device preferences related to specified devices to be used to access or to be prohibited or restricted from accessing the account. Information regarding these devices is stored in a database. Once device-based authentication is enabled the system assays a device fingerprint for a device to authenticate access by the device to the account based at least in part on the device preferences selected by the customer. Because the customer can choose to allow, restrict, or prevent access from various devices, the system herein is said to be selectably allowing access, based on customer preferences, to an account connected with the on-line product or service.

In some embodiments, input can also be collected regarding alert preferences related to alerts connected with accessing the account from specified devices. Thus, alerts can be sent to the customer or elsewhere when certain devices or unauthorized devices access the service as determined by assaying the device fingerprint. For both access control and alert enablement, device fingerprints can be evaluated by accessing a forensic database of device fingerprint information.

In some embodiments the user interface can serve to present an access history for the on-line account, wherein the access history includes at least some device fingerprint information, so that the customer can readily identify the devices might access the account. Device access and/or alert preferences specified by the customer can include geographic restrictions, time restrictions and/or activity restrictions, that is, certain devices or unknown devices can be restricted to only performing certain actions relative to the on-line account.

In at least some embodiments, the customer can uniquely name the devices from which he or she accesses an account. Thus, the customer can more easily recognize those devices on future access.

A system for implementing an embodiment of the invention can include an on-line account server to provide access to an account connected with the on-line service, and a device management server to receive customer input related to device preferences for specified devices and to assay device fingerprints. A forensic database connected to the device management server can be used to store the device fingerprint information. If the system also includes alerts capability, an alerts database can be connected to the device management server to store alert preferences related to alerts connected with accessing the account from specified devices.

In at least some embodiments, servers can be interconnected with Internet access functionality to provide World Wide Web access to the on-line accounts as well as the device and alert management features of an embodiment of the invention. Additionally, database systems can be used. The invention can be implemented via appropriate software and/or computer program code instructions. These instructions may be in the form of a computer program product, which is installed to run on the servers discussed above. The combination of hardware and software to perform the functions described can form the means to carry out the processes of the invention. It should be noted however, that the functions of such systems and software can be combined or separated in various ways. For example, a single computing system could provide any or all needed server and user interface functions.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

As previously discussed, the embodiments of the invention for use in, for example, banking or e-commerce over the World Wide Web make use of the fact that each device that connects via the Web has different parameters that can be captured and analyzed. Some of these parameters include the internet protocol (IP) address, operating system, application being used to access the Web (Internet Explorer, Firefox, Opera, Safari, etc.), installed hardware, and CPU attributes. In response to concerns about spoofing devices, device fingerprinting algorithms can include characteristics such as the CPU clock time and its associated drift or error taking into account the network latency as it relates to where the device is and has connected from. Geographic information regarding device location can also be collected via parameters maintained by and/or provided by Internet service providers.

While the main premise of Web-based applications today is ubiquitous access from any computer, emerging threats to information security have made systems operating according to this model vulnerable. Once a device can be uniquely identified, a Web-based application can decision the authenticity of the device and its right to gain access to on-line resources or perform specified functions. In example embodiments of the invention, the Web-based application can expose the devices that have both connected in the past, or are currently connected, and allow the user to make policy decisions for those devices. Specifically, according to example embodiments, the user can perform such functions as personalizing or naming unique devices that are used to connect to the service, making policies that allow or restrict access to connecting devices for that user's account, determine access rules and restrictions based on how devices connect (for example, allow only a single device or set of devices to have access, restrict access from different locations, at specific times, or for specific activities), and view the access and activity histories of devices that have connected for a specific user's account.

For purposes of an example relative to the embodiments of the invention presented herein, it can be assumed that the on-line account being discussed is an on-line banking account at a financial institution. However, it cannot be overemphasized that the invention can apply to any form of E-commerce, including stock trading, retail, on-line auctions, etc. Basically, embodiments of the invention could find use in any environment where users access an account of any kind on-line. Terms like "account" and "on-line service" are used herein in their broadest sense. Institutions, organizations, and corporations that maintain various types of accounts are widely varied in their organization and structure, as well as are the accounts themselves. These terms are intended to encompass all possibilities, including but not limited to finance companies, stock brokerages, credit card companies, utility companies, mortgage companies, manufacturers, retail establishments, music and movie download services, and on-line auctions.

In example embodiments, a customer with an on-line account can be presented with a user interface via a Web page. The user interface can be specifically directed at allowing the customer to manage devices, and may have a title such as, "Manage Your Devices" where the devices are those that are used to sign in to on-line banking with the customer's checking or savings account. In addition to blocking or restricting access by unauthorized devices altogether, the system can be set up to provide an extra challenge, such as a security question, to users access the account with the correct user ID and password but from an unauthorized device or a device in an unauthorized location. In addition, the interface can obtain input and customer selections with respect to generating alerts to be sent via Email, mail, or instant messaging (either Internet based or wireless phone based), to be sent if a certain device or an unauthorized device accesses an account. The system could also be set up to limit access by a known device being used outside a specific geographic region.

Figure 1:
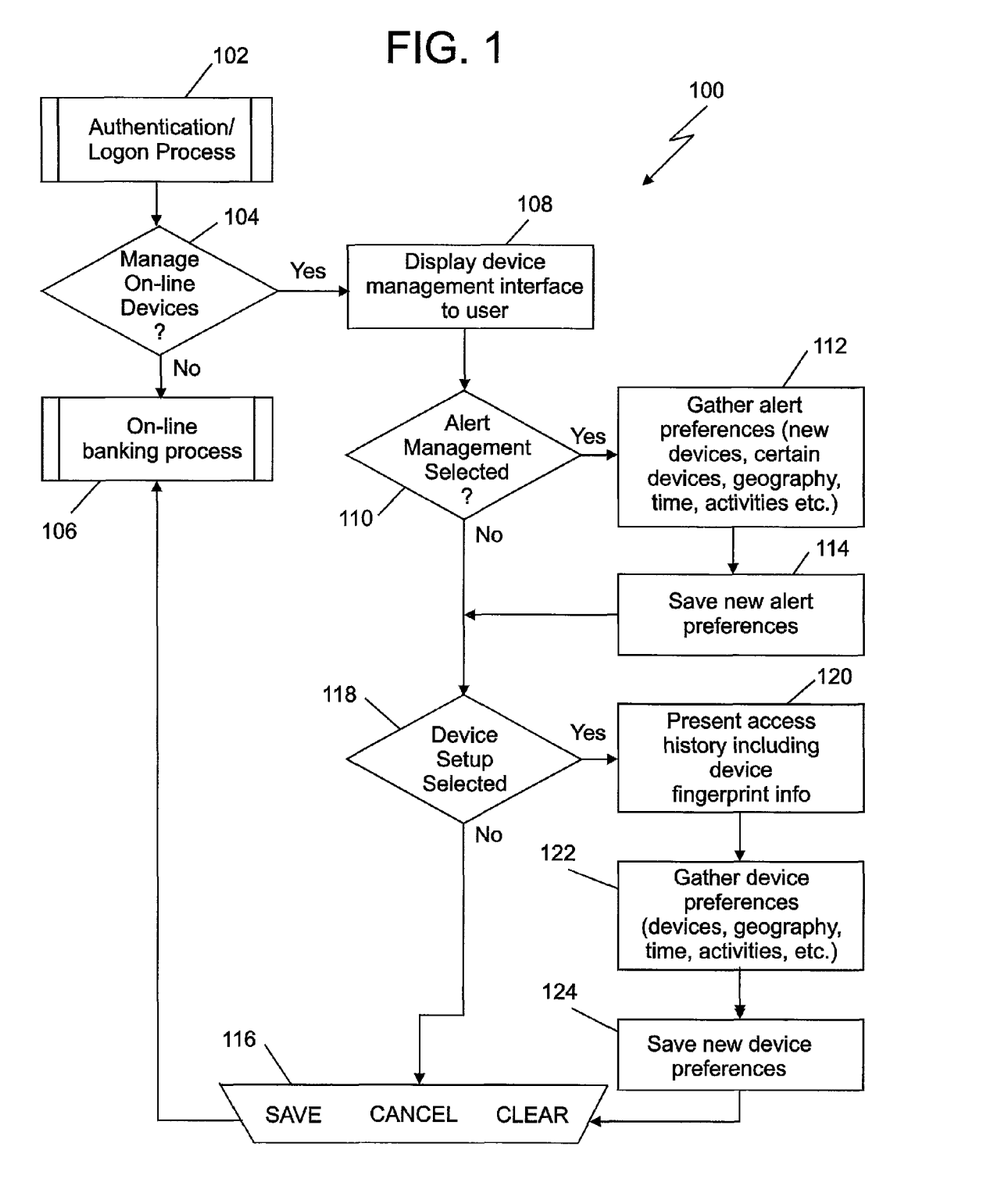
FIG. 1 is a flowchart illustrating how an embodiment of the invention interacts with an end user customer to enable the customer to manage device and alert preferences.

FIG. 1 presents a flowchart illustration of a process, 100, by which a customer with on-line access to a financial account can manage device based authentication for that account. Like most flowcharts, FIG. 1 illustrates process 100 as a series of process or sub-process blocks. At block 102, the customer goes through an authentication and/or logon process. If device based authentication is not yet enabled for the account, process 102 may be similar to typical account logon procedures as are known in the art. The authentication process as it exists once an embodiment of the invention is fully enabled is discussed in further detail with respect to FIGS. 3 and 4. At block 104 a prompt is issued to determine whether the customer would like to manage their on-line devices. If not, processing branches to block 106 where a normal on-line banking process takes place. If the customer indicates a desire to manage devices, processing branches to block 108 where a device management interface is displayed to the user. This device management interface will be discussed in further detail with respect to FIG. 2.

Figure 2:
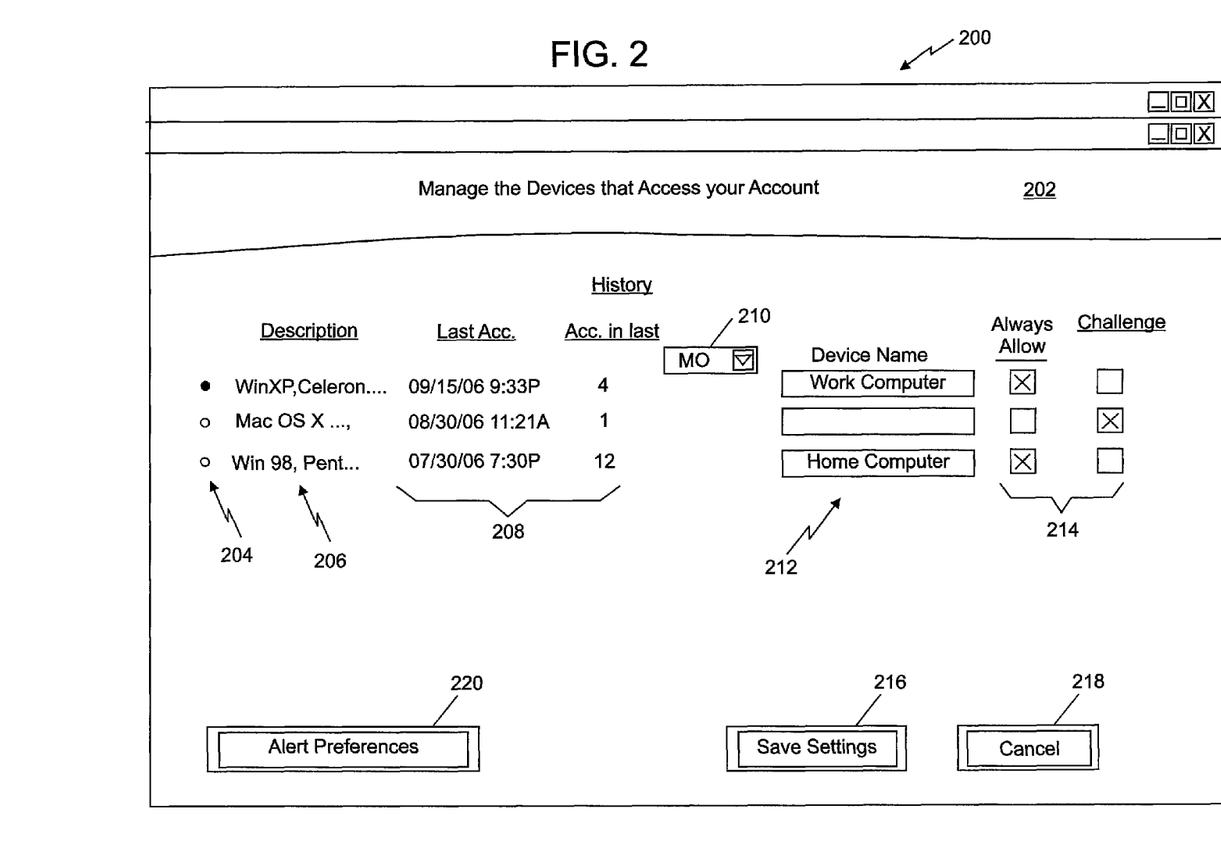
FIG. 2 is a screenshot showing a user interface according to example embodiments of the invention.

The device management interface contains a portion in which a customer can select to manage alert preferences, conceptually illustrated a decision block 110 of FIG. 1. If the customer chooses to manage alert preferences, alert preference information is gathered at block 112. As previously discussed, these alert preferences can pertain to new devices, certain devices, as well as other factors such as geography, on-line activities, etc. At block 114, a customer has the option of saving new alert preferences. In a typical user interface, many of these options would be presented together or in a different order, not withstanding the fact that they are shown in a sequence for purposes of convenient illustration by flowchart. For example, the option to save, cancel, or clear form entries on a Web page as shown at block 116 of FIG. 1 may be present on every screen.

Decision block 118 of FIG. 1 conceptually represents a customer selecting a device set-up option. When a customer selects this option, an access history including device fingerprint information is presented to the customer at block 120. Device preferences related to specific devices, geography, time, activities to be permitted on devices, etc. are gathered at block 122. Newly entered options and information can be saved at block 124. As previously mentioned, the option to save, cancel or clear on-line web forms as illustrated at block 116, may be present through much of these activities, possibly even on every screen presented. As shown in process 100, typically, once device management has been carried out, processing returns to the normal on-line banking process as shown at block 106. It should be noted that a customer may not wish to perform any on-line transactions at this time. In such a case, the customer may simply log out of the system at block 106.

FIG. 2 illustrates example display screen 200, which schematically represents a Web-browser window which has popped up over a main Web-browser window, as can be seen from the two sets of Microsoft windows style frame controls. Screen 200 is intended to present an example only. There are infinite ways to design a user interface within the scope of embodiments of the invention and the example presented herein is intended merely to convey a feel for the type of interface that might be used. In some respects the example of FIG. 2 is simplified for clarity. Section 202 of the pop-up window is a banner area which includes a title of this portion of the user interface. The data area of the screen includes an access history for the current on-line account. On each line is the information for a specific device. Column 204 includes virtual indicator lights wherein the one that is currently "lit" represents the device that is currently logged into the account. Column 206 includes a description of each particular device. This description includes device fingerprint information which a customer might recognize so as to be to tell which description goes with which of the customer's machines, or whether a description does not match any of the customer's machines. As can be seen in this example, operating system and processor type are shown; however additional information is available by mousing over these fields so that a customer may get a more complete picture of each specific machine. Column 208 includes access history information, in this example, the date and time of last access and the number of accesses in a previous time period. Drop down box 210 can be used to change the relevant time period being viewed, for example a user can select a month, a week, or a year.

Still referring to FIG. 2, in column 212 the customer can give each device a unique name to aid in remembering the devices when the customer makes changes to alert preferences or device preferences. The name only needs to be unique among a specified customer's devices, and can be considered for purposes of this disclosure as another device preference. Check box columns 214 allow the customer to indicate that a machine is to always be allowed free access, or to always be challenged with an additional security question. It cannot be overemphasized that the choices of columns and features to be used in a particular embodiment of the invention are somewhat arbitrary; the interface could be designed with more columns, or different columns, for instance, the challenge check boxes could be replaced or supplemented with check boxes to never allow access from a particular machine.

A save settings button, 216 and a cancel button, 218 are shown in the bottom right area of screen 200 of FIG. 2. Either button in this example embodiment closes the manage device interface window and returns to the normal Web browser screen. Button 216 would save the new settings just entered by the user, while button 218 would discard the recent changes. In this example, button 220 would open another window which allows the customer to manage preferences for alerts based on devices that have been set up.

Again, there are numerous ways of designing a system to implement an embodiment of the invention. One issue that must be dealt with is how to populate the system with enough information about the customer's devices to allow a customer to make intelligent choices about managing device access. For example, many computer users are not even aware of configuration items such as the processor, installed adaptors, or even the operating system. An enterprise making use of the invention could design a system so that a new account holder is made aware of the ability to manage device-based authentication, however the on-line device management and device-based authentication aspects of the system are initially disabled by default. When the customer first logs into their account, they could be presented with a screen explaining the customer managed device-based authentication features, and suggesting that these features not be enabled for some period of time, for example, thirty days. The system could then suggest that the customer make an effort to log on to conduct transactions from every device they may wish to use in the foreseeable future. At the first logon after the thirty days have passed, a prompt could automatically be issued to the customer suggesting that they use the interface to set up device preferences and alerts. At that point, the system would have gathered device fingerprints from every device the customer had used over the past thirty days, and the customer could make intelligent decisions about when and how to allow access and when and how to receive alerts.

Another option for gathering device fingerprint information would be to implement an embodiment of the invention so that access by certain devices is not normally ever prohibited, but challenge questions are issued whenever a new device obtains access to the account. At this point, whenever a customer accessed their account with a new device, they would be asked extra security questions to be authenticated. Once the customer is authenticated, the customer could enter the device management interface and authorize the current device and any other device not previously dealt with to access the account in the future without the extra questions. Again, there are almost infinite ways that a system could be configured within the spirit and scope of embodiments of the invention and the present description and drawings are given by way of example only.

Figures 3, 4:
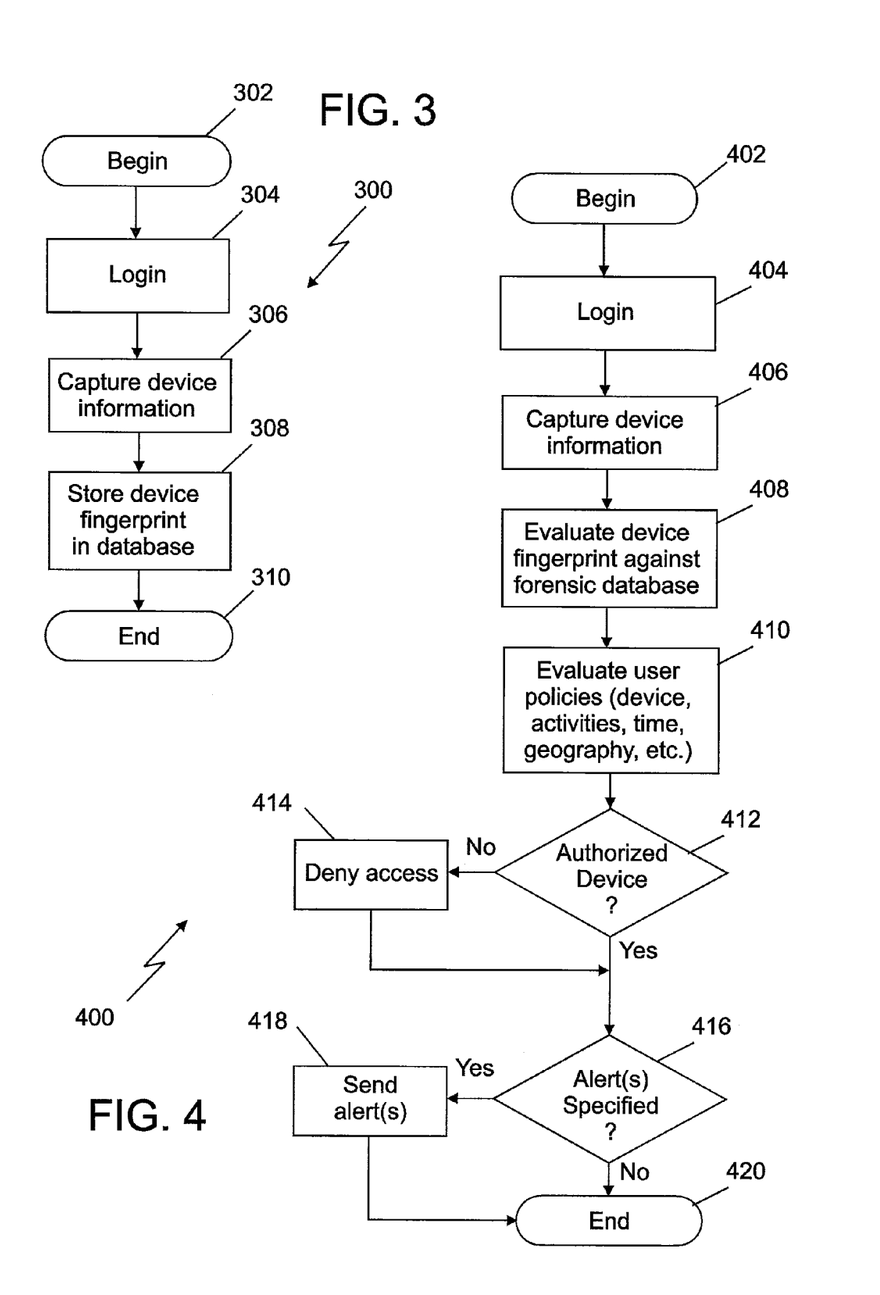
FIG. 3 is a flowchart showing the authentication process in example embodiments prior to device-based authentication being enabled for a customer account.
FIG. 4 is a flowchart showing the authentication process in example embodiments when device-based authentication is enabled for a customer account.

FIG. 3 presents a flowchart of a process, 300, for authentication and logon where device based authentication has not been enabled, for example, during the initial use period by a new user as previously discussed. The authentication process begins at block 302 and customer login occurs at block 304. At block 306, device information is obtained in order to acquire a device fingerprint for the device currently being used by the customer. At block 308 the device fingerprint information is stored in the forensic database. The process ends at block 310.

FIG. 4 illustrates an authentication process, 400, used once device based authentication has been configured and initiated by a customer of an enterprise implementing an embodiment of the invention. Process 400 begins at block 402 and the customer logs in at block 404. At block 406, device information is captured from the device currently accessing the account. A device fingerprint of the current device is evaluated against the forensic database at block 408. User policies are evaluated at block 410. These policies include information the user has configured related to device management and alerts based on specific devices, specific activities, time, geographic restrictions, and anything else that the specific embodiment of the invention being employed includes.

In the example embodiment of FIG. 4, a determination is made at block 412 as to whether the current device is authorized. If not, access is denied at block 414. In either case processing proceeds to block 416 where determination is made as to whether specified alerts need to be sent regarding access by this particular device. It should be noted that alerts may be sent even if the device is granted access, as the customer may have set up his or her preferences so that new devices are allowed access, but an alert is generated, or, for example, so that certain devices generate an alert and others do not. If alerts need to be sent, they are sent at block 418. In either case, the process ends at block 420.

The most readily contemplated form of alert would be an Email message to a trusted Email address of the customer. However, many types of alert scenarios could be designed by one of ordinary skill in the art. For example, assuming the present embodiment is employed at a financial institution, an alert could be sent to someone at the financial institution either together with or in place of an alert to the customer. An alert could also be sent by having the system produce a printed communication to be delivered via mail. Alerts could also be sent via some sort of instant messaging service, to a wireless device via text messaging or short message service (SMS) or by setting up the system so an alert is presented via the World Wide Web when the customer logs on from a different device. An automated telephone calling system with a recorded message could also be used. Again, these scenarios are examples only, and many possible design choices can be made regarding how to implement the alert functionality disclosed herein, as well as all of the other functions described.

Figure 5:
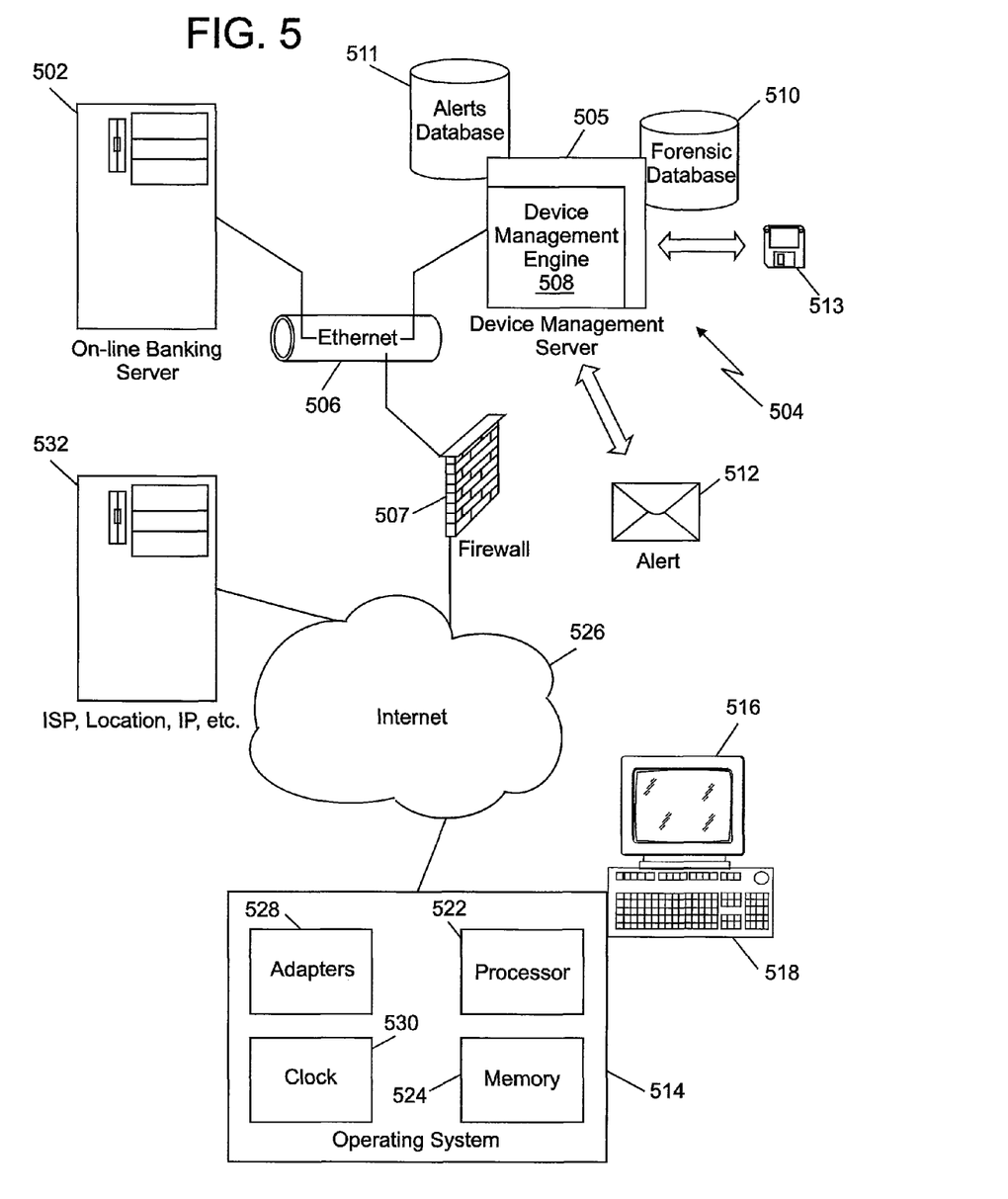
FIG. 5 is a system block diagram illustrating an example operating environment for embodiments of the present invention.

Turning to FIG. 5, a network block diagram showing the systems involved in implementing an example embodiment of the invention is shown. On-line financial transaction server 502 is an on-line banking server. The institution also maintains device management system 504 including server 505. The device management system stores fingerprint information, stores alert preferences, and carries out the process of presenting the user interface to customers and gathering customer input. The device management system also gathers fingerprint information from connected devices. The servers are connected via an Ethernet local area network (LAN), 506. As is the case with most businesses, these resources are located behind an Internet firewall 507. The on-line banking server and the device management server are shown in this example as implemented on separate hardware platforms; however, they could just as easily be implemented on a single platform.

Still referring to FIG. 5, device management server 505 includes a device management software engine, 508. The engine includes the computer program to interact with customer computer systems and carry out the processes of an embodiment of the invention. Forensic database 510, stores device fingerprint information and alerts database 511 stores customer alert preferences, which can be used to send an alert such as the conceptually illustrated alert 512. Computer program instructions to implement the various functions of the invention reside partly in memory of server 505 when it is in operation. When the system is not in operation, the instructions typically reside a fixed magnetic disk (not shown). The computer program instructions may also be stored on portable media such as a CD-ROM, tape cartridge, or removable magnetic disk, as conceptually illustrated by disc 513.

A customer computer system 514 of FIG. 5 is represented by a conceptual block diagram. Such a client system is typically connected to peripherals such as display 516 and keyboard 518. The processing platform includes one or more processors 522, and a certain amount of memory, 524. The customer computer system accesses the bank's servers via the Internet, 526. During device fingerprinting, information can also be gathered on installed adapters 528, the operating system as indicated by the diagram legend, and characteristics of the system clock, 530. Note that the network adapter or chip located within adapters 528 of system 514 would have a MAC address that could be used as part of the device fingerprint. Additionally, information on the geographic location and IP address or at least the IP domain or address range might be accessible as these parameters are typically supplied to the customer system through an Internet service provider (ISP), 532.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of providing customer-managed, device-based authentication of access to an on-line service, the method comprising:
   determining one or more customer devices that have previously connected or that are currently connected;
   updating a list of one or more customer devices in response to determining one or more customer devices that have previously connected or that are currently connected;
   presenting a device management interface comprising the list of one or more customer devices, at least one of the customer devices being a previously connected device or a currently connected device, the device management interface comprising:
      description of each of the customer devices on the list, the description comprising device parameters comprising at least one of an operating system or a processor type so that the customer may recognize which customer device from the list corresponds with the description;
   receiving customer input regarding one or more authentication preferences of at least one of the one or more customer devices;
   storing device parameters and, based on the customer input, device preferences related to one or more of the customer devices selectably accessing an account connected with the on-line service;
   collecting one or more device parameters from a device requesting access to the on-line service;
   comparing the one or more device parameters of the device requesting access with the stored device parameters related to the one or more customer devices; and
   authenticating the device requesting access to the account based at least in part on the comparison and the stored device preferences.

2. The method of claim 1 further comprising:
   storing, based on the customer input, alert preferences related to alerts connected with accessing the account from customer devices;
   determining when to send at least one alert based at least in part on the alert preferences.

3. The method of claim 2 wherein at least one of the authenticating the device requesting access and the determining when to send at least one alert based at least in part on the alert preferences comprises accessing a forensic database to retrieve the stored device parameters related to the one or more customer devices.

4. A computer program product comprising a non-transitory computer-readable medium comprising computer-readable instructions for performing the method of claim 3.

5. The method of claim 2 wherein the device preferences include at least one selected from the group consisting of geographic restrictions, time restrictions and activity restrictions.

6. A computer program product comprising a non-transitory computer-readable medium comprising computer-readable instructions for performing the method of claim 5.

7. A computer program product comprising a non-transitory computer-readable medium comprising computer-readable instructions for performing the method of claim 2.

8. The method of claim 1 wherein the comparing comprises accessing a forensic database to retrieve the stored device parameters related to the one or more customer devices.

9. A computer program product comprising a non-transitory computer-readable medium comprising computer-readable instructions for performing the method of claim 8.

10. The method of claim 1 further comprising presenting an access history for the account, wherein the access history includes at least some information related to the authenticating the device requesting access.

11. A computer program product comprising a non-transitory computer-readable medium comprising computer-readable instructions for performing the method of claim 10.

12. The method of claim 1 wherein the device preferences include at least one selected from the group consisting of geographic restrictions, time restrictions, a unique name, and activity restrictions.

13. A computer program product comprising a non-transitory computer-readable medium comprising computer-readable instructions for performing the method of claim 1.

14. The method of claim 1, wherein the customer input regarding one or more authentication preferences indicates a level of authentication to be associated with the at least one of the one or more customer devices.

15. The method of claim 1, wherein the authentication preferences comprise always allow preferences and the device management interface comprises a list of input fields for the always allow preferences, each input field for the always allow preferences corresponding to at least one of the customer devices on the list of the device management interface and configured for receiving customer input regarding whether the customer device corresponding to each input field should always be authenticated.

16. The method of claim 1, wherein the authentication preferences comprise never allow preferences and the device management interface comprises a list of input fields for the never allow preferences, each input field for the never allow preferences corresponding to at least one of the customer devices on the list of the device management interface and configured for receiving customer input regarding whether the customer device corresponding to each input field should never be authenticated.

17. The method of claim 1, wherein the authentication preferences comprise challenge preferences and the device management interface comprises a list of input fields for the challenge preferences, each input field for the challenge preferences corresponding to at least one of the customer devices on the list of the device management interface and configured for receiving customer input regarding whether the customer device corresponding to each input field should be challenged with an additional security question.

18. The method of claim 1, further comprising:
receiving customer input regarding one or more unique names each corresponding to one customer device;
storing the unique names corresponding to the customer devices in the list; and wherein presenting a device management interface comprising a list of one or more customer devices comprises:
presenting the unique names corresponding to the customer devices in the list.

19. The method of claim 1, wherein the one or more customer devices comprises a plurality of customer devices and wherein storing device parameters and, based on customer input, device preferences comprises:
storing, before closure of a period of initial use whereby the customer connects with the on-line service using a plurality of customer devices, device parameters related to the plurality of customer devices selectably accessing an account connected with the on-line service; and
storing, based on customer input, device preferences related to the plurality of customer devices selectably accessing an account connected with the on-line service; and wherein:
collecting one or more of the device parameters from a device requesting access to the on-line service comprises:
collecting, during the period of initial use and subsequent to a closure of the period of initial use, one or more device parameters from a device requesting access to the on-line service.

20. The computer-implemented method of claim 1, wherein presenting further comprises:
presenting, as part of the device management interface, a virtual indicator light corresponding to one of the customer devices on the list and representing that the corresponding customer device is currently connected.

21. The computer-implemented method of claim 1, further comprises:
presenting, as part of the device management interface, additional information regarding one or more of the customer devices on the list when the customer hovers a pointing device over the description information.

22. The computer-implemented method of claim 1, further comprises:
presenting, as part of the device management interface, one or more input fields allowing the customer to indicate, on a customer device-by-customer device basis, that a customer device on the list will always be allowed free access or always be challenged with an additional security question.

23. Apparatus for providing customer-managed, device-based authentication of access to an on-line service, the apparatus comprising:
means for determining one or more customer devices that have previously connected or that are currently connected;
means for updating the list of one or more customer devices in response to determining one or more customer devices that have previously connected or that are currently connected;
means for presenting a device management interface comprising the list of one or more customer devices, at least one of the customer devices being a previously connected device or a currently connected device, the device management interface comprising:
description of each of the customer devices on the list, the description comprising device parameters comprising at least one of an operating system or a processor type so that the customer may recognize which customer device from the list corresponds with the description;
means for receiving customer input regarding one or more authentication preferences of at least one of the one or more customer devices;
means for receiving customer input;
means for storing device parameters and, based on the customer input, device preferences related to one or more of the customer devices selectably accessing an account connected with the on-line service;
means for comparing the one or more device parameters of the device requesting access with the stored device parameters related to the one or more customer devices; and
means for authenticating the device requesting access to the account based at least in part on the comparison and the stored device preferences.

24. The apparatus of claim 23 further comprising:
means for storing, based on the customer input, alert preferences related to alerts connected-with accessing the account from customer devices;
means for determining when to send at least one alert based at least in part on the alert preferences.

25. The apparatus of claim 24 further comprising means for presenting an access history for the on-line account, wherein the access history includes at least some information related to the authenticating the device requesting access.

26. The apparatus of claim 23 further comprising means for presenting an access history for the on-line account, wherein the access history includes at least some information related to the authenticating the device requesting access.

27. A system for providing customer-managed, device-based authenticated access to an on-line service, the system comprising:
an on-line account server configured for providing access to an account connected with the on-line service;
a device management server configured for:
determining one or more customer devices that have previously connected or that are currently connected;
updating the list of one or more customer devices in response to determining one or more customer devices that have previously connected or that are currently connected;
presenting a device management interface comprising the list of one or more customer devices, at least one of the customer devices being a previously connected device or a currently connected device, the device management interface comprising:
  description of each of the customer devices on the list, the description comprising device parameters comprising at least one of an operating system or a processor type so that the customer may recognize which customer device from the list corresponds with the description;
  receiving customer input regarding one or more authentication preferences of at least one of the one or more customer devices;
  receiving device parameters and customer input related to device preferences related to one or more specified devices selectably accessing the account;
  collecting one or more device parameters from a device requesting access to the on-line service;
  comparing the one or more device parameters of the device requesting access with the stored device parameters related to the one or more customer devices; and
  authenticating the device requesting access to the account based at least in part on the comparison and the stored device preferences, the device management server functionally connected to the on-line account server; and
a forensic database connected to the device management server and configured for storing the device parameters and device preferences related to the one or more customer devices selectably accessing the account.

28. The system of claim 27 further comprising an alerts database connected to the device management server and configured for storing alert preferences related to alerts connected with accessing the account from the one or more customer devices.

29. The system of claim 27 wherein the device management server is further configured for presenting an access history for the account, wherein the access history includes at least some information related to the authenticating the device requesting access.

30. The system of claim 27 wherein the device preferences include at least one selected from the group consisting of geographic restrictions, time restrictions, a unique name, and activity restrictions.

31. The system of claim 27 wherein the device management system is configured for storing a unique name assigned to at least one of the customer devices, the unique name received as part of the customer input.

32. A computer-implemented method of providing customer-managed, device-based authentication of access to an on-line service, the method comprising:
  storing, before closure of a period of initial use whereby the customer connects with the on-line service using a plurality of customer devices, wherein at least one of the customer device parameters related to the plurality of customer devices selectably accessing an account connected with the on-line service;
  determining one or more customer devices that have previously connected or that are currently connected;
  updating a list of one or more customer devices in response to determining one or more customer devices that have previously connected or that are currently connected;
  presenting a device management interface comprising the list of one or more customer devices, at least one of the customer devices being a previously connected device or a currently connected device, the device management interface comprising:
    description of each of the customer devices on the list, the description comprising device parameters comprising at least one of an operating system or a processor type so that the customer may recognize which customer device from the list corresponds with the description;
  storing, based on customer input, device preferences related to the plurality of customer devices selectably accessing an account connected with the on-line service;
  collecting, after closure of the period of initial use, one or more device parameters from a device requesting access to the on-line service;
  comparing the one or more device parameters of the device requesting access with the stored device parameters related to the plurality of customer devices; and
  authenticating the device requesting access to the account based at least in part on the comparison and the stored device preferences.

33. The method of claim 32, further comprising:
  storing, based on the customer input, alert preferences related to alerts connected with accessing the account from customer devices;
  determining when to send at least one alert based at least in part on the alert preferences.

34. A computer program product comprising a non-transitory computer-readable medium comprising computer-readable instructions for performing the method of claim 33.

35. The method of claim 32, wherein the comparing comprises accessing a forensic database to retrieve the stored device parameters related to the one or more customer devices.

36. A computer program product comprising a non-transitory computer-readable medium comprising computer-readable instructions for performing the method of claim 35.

37. The method of claim 32, further comprising presenting an access history for the account, wherein the access history includes at least some information related to the authenticating the device requesting access.

38. A computer program product comprising a non-transitory computer-readable medium comprising computer-readable instructions for performing the method of claim 37.

39. The method of claim 32, wherein the device preferences include at least one selected from the group consisting of geographic restrictions, time restrictions, a unique name, and activity restrictions.

40. A computer program product comprising a non-transitory computer-readable medium comprising computer-readable instructions for performing the method of claim 39.

41. The method of claim 32, wherein storing, based on customer input, device preferences related to the plurality of customer devices selectably accessing an account connected with the on-line service comprises storing during the period of initial use and before closure of the period of initial use.

42. A computer program product comprising a non-transitory computer-readable medium comprising computer-readable instructions for performing the method of claim 41.

43. The method of claim 32, wherein storing, based on customer input, device preferences related to the plurality of customer devices selectably accessing an account connected with the on-line service comprises storing after closure of the period of initial use.

44. A computer program product comprising a non-transitory computer-readable medium comprising computer-readable instructions for performing the method of claim 43.

45. A computer program product comprising a non-transitory computer-readable medium comprising computer-readable instructions for performing the method of claim 32.

46. The computer-implemented method of claim 32, further comprising:

in response to a customer logging into the on-line service for a first time, presenting a screen explaining the customer-managed, device-based authentication features;

communicating a message suggesting that the customer-managed, device-based authentication features not be enabled for some period of time; and receiving customer input regarding whether to enable the customer-managed, device-based authentication features immediately or after the period of initial use.

47. The computer-implemented method of claim 32, further comprising:

before closure of the period of initial use, communicating a message suggesting that the customer make an effort to log-on from a plurality of customer devices.

48. The computer-implemented method of claim 32, further comprising:

in response to closure of the period of initial use, communicating a message suggesting that the customer set-up device preferences or alerts.

49. A computer-implemented method of providing customer-managed, device-based authentication of access to an on-line service, the method comprising:

determining one or more customer devices that are currently connected;

updating a list of one or more customer devices in response to determining one or more customer devices that are currently connected and one or more customer devices that were previously connected other than the one or more customer devices that are currently connected;

presenting a device management interface comprising the list of one or more customer devices, at least one of the customer devices being a currently connected device and at least one of the customer devices being a previously connected device, the device management interface comprising:

description of each of the customer devices on the list, the description comprising device parameters comprising at least one of an operating system or a processor type so that the customer may recognize which customer device from the list corresponds with the description;

receiving customer input regarding one or more authentication preferences of at least one of the one or more customer devices;

storing device parameters and, based on the customer input, device preferences related to one or more of the customer devices selectably accessing an account connected with the on-line service;

collecting one or more device parameters from a device requesting access to the on-line service;

comparing the one or more device parameters of the device requesting access with the stored device parameters related to the one or more customer devices; and authenticating the device requesting access to the account based at least in part on the comparison and the stored device preferences.

\* \* \* \* \*